United States Patent [19]

Tsujioka et al.

[11] Patent Number: 5,316,900
[45] Date of Patent: May 31, 1994

[54] OPTICAL RECORDING MEDIUM HAVING A CONSTANT BIREFRINGENT PROPERTY AND AN ALTERABLE PHOTOCHROMIC PROPERTY

[75] Inventors: Tsuyoshi Tsujioka, Osaka; Fumio Tatezono, Hirakata; Koutaro Matsuura, Tsuzuki; Masahiro Irie, Kasuga, all of Japan

[73] Assignees: Sanyo Electric Co., Ltd., Osaka; Masahiro Irie, Fukuoka, both of Japan

[21] Appl. No.: 138,246

[22] Filed: Oct. 15, 1993

Related U.S. Application Data

[63] Continuation-in-part of Ser. No. 25,725, Mar. 2, 1993, abandoned, which is a continuation of Ser. No. 585,611, Sep. 20, 1990, abandoned.

[30] Foreign Application Priority Data

Sep. 22, 1989 [JP] Japan .................................. 1-246693
Mar. 28, 1990 [JP] Japan .................................. 2-80125

[51] Int. Cl.⁵ ............................ G03C 1/73; G11B 7/24
[52] U.S. Cl. .................................... 430/495; 430/270; 430/945; 346/135.1; 365/121; 369/275.1; 369/284
[58] Field of Search ................ 430/270, 495, 945; 346/135.1, 76 L; 358/297; 369/275.1, 283, 284, 286; 365/120, 121

[56] References Cited

U.S. PATENT DOCUMENTS

| | | | |
|---|---|---|---|
| 4,551,819 | 11/1985 | Michl | 365/120 |
| 5,011,756 | 4/1991 | Nikles | 430/19 |
| 5,061,582 | 10/1991 | Brettle | 430/945 |

Primary Examiner—Marion E. McCamish
Assistant Examiner—Kathleen Duda
Attorney, Agent, or Firm—Peter L. Michaelson

[57] ABSTRACT

A recording medium comprises a recording layer, a birefringent layer, and a reflecting layer. The recording layer is formed of a material whose optical rotatory power is alterable such that in one state no optical rotatory power is present and, in a second state, optical rotatory power is present. Information is recorded in the recording layer by selectively altering the state of the recording layer. The birefringent layer is formed of a material having constant birefringence without regard to the state of the recording layer. The reflecting layer reflects a light beam transmitted through the recording layer and the birefringent layer to reintroduce the beam into the birefringent layer and the recording layer. A method of reproducing information from this recording medium applies a polarized light beam to the recording medium and detects change of the polarized state of the polarized light beam reflected from the recording medium, thereby reading the information recorded in the recording layer. According to the inventive recording medium and reproducing method, the information is reproduced by detecting the presence of optical rotatory power of the recording layer.

10 Claims, 6 Drawing Sheets

(SPIROPYRAN FORM)    (MEROCYANINE FORM)

FIG. 5

TRANS        CIS

OPTICAL RECORDING MEDIUM HAVING A CONSTANT BIREFRINGENT PROPERTY AND AN ALTERABLE PHOTOCHROMIC PROPERTY

This application is a continuation-in-part of our co-pending United States patent application entitled "An Optical Recording Medium Having A Constant Birefringent Property And An Alterable Photochromic Property", filed Mar. 2, 1993 and accorded Ser. No. 08/025,725, now abandoned, which is a continuation of our United States patent application entitled "Recording Medium and Reproducing Method Therefor", filed Sep. 20, 1990 and accorded Ser. No. 07/585,611, now abandoned. This application has been assigned to the present assignee of the parent applications.

BACKGROUND OF THE INVENTION

1. Field of the Invention

The present invention relates to a recording medium which enables high-density recording and a method of reproducing information recorded therein and more particularly, to a recording medium having a constant birefringent property and an alterable photochromic property.

2. Background of the Invention

In recent years, an organic photochromic material of a photon mode has been studied as a material for use as a recording layer. When the photochromic material is exposed to light of a prescribed first wavelength, a photochemical reaction changes the molecular structure of the material. The changed molecular structure returns to its original structure when the material is exposed to light of a second wavelength. In response to such change in the molecular structure, absorptiveness of the material is also greatly changed with respect to light beams of prescribed wavelengths.

A photochromic material having such a property can be used as a recording layer in a recording medium in order to record information using a light beam having the aforementioned first wavelength. Further, the information can be reproduced through a light beam having the aforementioned second wavelength.

When such a reproducing method is employed, however, a previously recorded portion of the recording layer absorbs the reproducing beam, and hence the molecular structure of the previously recorded portion is unfortunately changed to that of an unrecorded state.

Japanese Patent Laying-Open Gazette 63-259850 discloses a reproducing method that utilizes the optical rotatory power of the photochromic material to record information. The term "optical rotatory power" indicates such a phenomenon wherein a prescribed material rotates the plane of polarization of a linearly polarized light beam which is introduced into and transmitted through the material. In the aforementioned photochromic material, presence/absence of such optical rotatory power determines the recorded/unrecorded state. Thus, it is possible to read information by a reader which is provided with means for detecting such rotation of the polarization azimuth angle of a linearly polarized light beam. According to this method, further, it is possible to select a wavelength for the reproducing beam which is not absorbed by the recording layer. Such a selection is possible because optical rotatory power is also present in a region out of the band of absorbed wavelengths. Thus, it is possible to prevent the aforementioned erasing of information caused by the reproducing beam.

Figure 10:
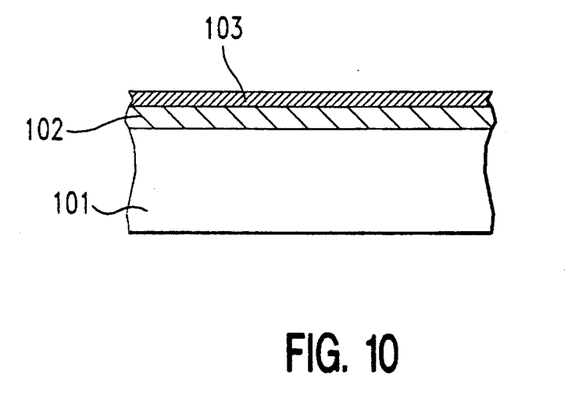
FIG. 10 is a sectional view showing an example of a conventional recording medium.

FIG. 10 is a sectional view showing a conventional recording medium which is disclosed in Japanese Patent Laying-Open Gazette No. 63-259850. Referring to FIG. 10, a recording layer 102 is formed on a transparent substrate 101, and a reflecting layer 103 is formed on the recording layer 102. This conventional recording medium records information by exposing a portion of the recording layer 102 to a light beam having a specific wavelength and changing the molecular structure of the exposed portion.

In such a reflection type recording medium, however, it is impossible, in principle, to reproduce information that has previously been recorded using changes in the optical rotatory power of the medium. The reason for this is as follows:

FIGS. 11A to 11D illustrate states of rotation of the azimuth angle of the polarization of a linearly polarized light beam which is introduced into the conventional recording medium shown in FIG. 10.

Figure 11A:
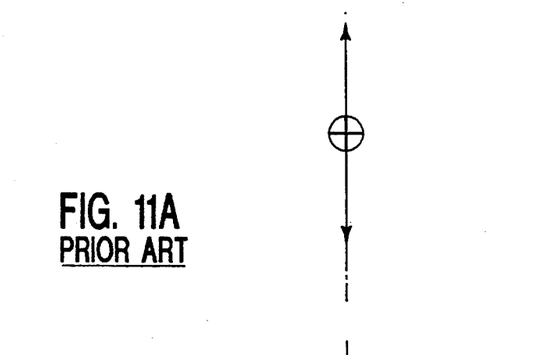
FIG. 11A shows the plane of polarization of the beam introduced into a recording layer.
Figure 11B:
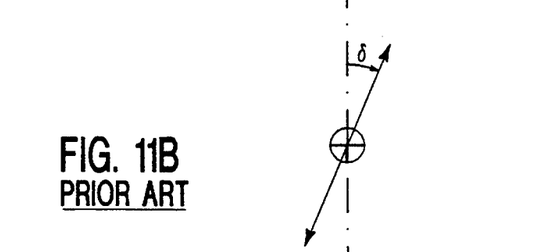
FIG. 11B shows the plane of polarization of the beam, transmitted through the recording layer, which is on the point of being reflected by a reflecting layer.
Figure 11C:
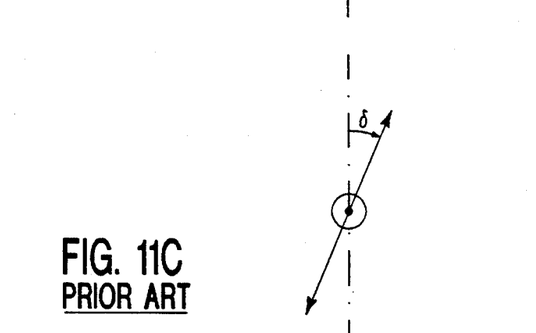
FIG. 11C shows the plane of polarization of the beam just reflected by the reflecting layer.
Figure 11D:
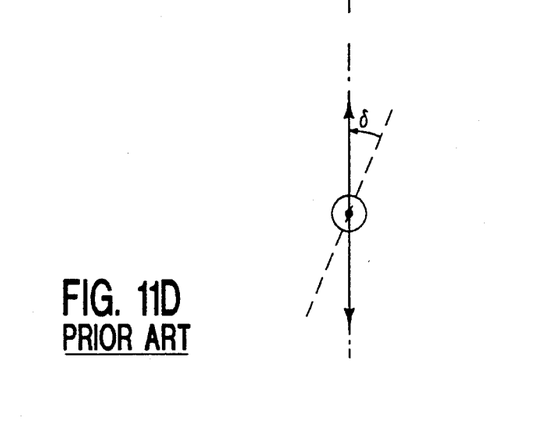
FIG. 11D shows the plane of polarization of the beam retransmitted through the recording layer.

FIG. 11A shows the plane of polarization of the beam which is incident upon the recording layer. FIG. 11B shows the plane of polarization of the beam, transmitted through the recording layer, which is on the point of being reflected by the reflecting layer. As shown in FIG. 11B, the plane of polarization of the beam is rotated clockwise by an angle δ as viewed from the substrate. FIG. 11C shows the plane of polarization of the beam just reflected by the reflecting layer. As shown in FIG. 11C, the plane of polarization of the beam is reflected in the state rotated by the angle δ. FIG. 11D shows the plane of polarization of the beam retransmitted through the recording layer. When the beam is thus retransmitted through the recording layer, its plane of polarization is rotated counterclockwise by the angle δ as viewed from the substrate, since the reflected beam advances in a direction opposite to that of incidence. Consequently, the plane of polarization of the reproducing beam reflected from the recording medium returns to the state the beam had upon incidence, as shown in FIG. 11D. In the conventional reflection type recording medium, therefore, it has been impossible, in principle, to reproduce information that has previously been recorded by altering the optical rotatory power of the medium.

Also when a circularly or elliptically polarized light beam is employed, no change is caused in the polarized state of the reflected beam in response to the state of the recording layer. Hence it is impossible to reproduce information that has been recorded by changing the optical rotatory power of the recording layer. In the recording medium of the conventional structure as shown in FIG. 10, therefore, no change is caused in the polarized state of the beam reflected from the recording medium, even if the recording layer has optical rotatory power. Thus, it has been impossible to read information that has been recorded by changing the optical rotatory power of a material.

SUMMARY OF THE INVENTION

An object of the present invention is to provide a recording medium of a reflection type which can reproduce information that is recorded by changing the optical rotatory power of the medium and a method of reproducing the information.

The recording medium according to the present invention comprises a recording layer containing a material whose optical rotatory power is changed to record information therein, a birefringent layer for changing a state of the polarization of a light beam, and a reflecting layer for reflecting the beam transmitted through the recording layer and the birefringent layer to reintroduce the same into the birefringent layer and the recording layer.

The birefringent layer can be formed by bringing a quarter-wave plate into close contact with the recording layer, for example. Further, the birefringent layer can be formed as a thin film by bringing the same into a columnar structure which is obliquely grown with respect to a substrate. In this case, a neutral axis is generated in the direction of growth of the columnar structure as viewed from the upper surface of the substrate. Such a thin film can be formed by vacuum deposition, sputtering or the like.

According to the present invention, the recording layer contains a material whose optical rotatory power is changed to record information therein. The optical rotatory power can be changed by application of light, heat or the like. Alternatively, the optical rotatory power may be changed by change of an external field such as an electric field, a magnetic field or the like. Information is recorded by such changes in the optical rotatory power while the birefringence of the birefringent layer is not altered by the recording process. As such, the birefringence remains constant whether information is recorded in the medium or not.

According to the present invention, further, a single layer may serve both as the recording layer and the birefringent layer. Such a layer serving both as the recording layer and the birefringent layer is called a recording/birefringent layer in this specification.

For example, the recording/birefringent layer can be formed by unidirectionally stretching a thin film which contains a material having optical rotatory power. When the material having optical rotatory power is of monomer and/or oligomer introduced birefringence is small. In this case, a polymer material is contained in the thin film in order to introduce large birefringence into the thin film. Alternatively, it is possible to employ another method in order to introduce birefringence into the recording/birefringent layer.

The reproducing method for a recording medium according to the present invention comprises a step of applying a polarized light beam to a recording medium having the aforementioned recording, birefringent and reflecting layers, and a step of reading information recorded in the recording layer by detecting changes in the polarized state of the polarized light beam reflected from the recording medium.

In a preferred embodiment of the present invention, a linearly polarized light beam is employed for reproduction. According to this embodiment, the beam is preferably incident upon the recording medium so that the plane of polarization of the beam matches with the direction of a neutral axis of the birefringent layer of the recording medium.

The term "neutral axis" of the birefringent layer indicates a fast axis or a slow axis. The beam is so introduced into the recording medium that its plane of polarization matches with the direction of the fast axis or the slow axis of the birefringent layer.

The birefringent layer preferably has such a thickness that a retardation is a constant $\pi/2$ with respect to the wavelength of the polarized light beam serving as a reproducing beam.

The action of the present invention is now described.

When a recording medium has optical rotatory power, its optical rotatory power in Jones matrix representation is expressed as follows, assuming that $\delta$ represents the angle of polarization rotation:

$$R(\delta) = \begin{vmatrix} \cos\delta & -\sin\delta \\ \sin\delta & \cos\delta \end{vmatrix} \tag{1}$$

When a recording medium has a constant retardation action of a quarter-wave plate, this action is matrix-represented as follows, assuming that $\gamma$ represents the constant amount of retardation provided by the birefringent layer:

$$P(\gamma) = \begin{vmatrix} e^{i\frac{\gamma}{2}} & 0 \\ 0 & e^{-i\frac{\gamma}{2}} \end{vmatrix} \tag{2}$$

The inventive recording medium contains combination of two such actions and reflection. In general, the polarized state of an incident light beam is matrix-represented as follows:

$$E_0 = \begin{vmatrix} E_x \\ E_y \end{vmatrix} = \begin{vmatrix} \alpha \\ \beta \end{vmatrix} \tag{3}$$

When such a beam is introduced into the inventive recording medium, the same is subjected to the optical rotatory power of the recording layer as well as to the retardation action by the birefringent layer respectively, and then reflected by the reflecting layer. When the beam represented by the expression (3) is introduced into the recording medium, the beam which is on the point of being reflected by the reflecting layer is in the following polarized state, from the expressions (1) and (2):

$$\begin{aligned} E_1 &= P(\gamma) \cdot R(\delta) \cdot E_0 \\ &= \begin{vmatrix} e^{i\frac{\gamma}{2}} & 0 \\ 0 & e^{-i\frac{\gamma}{2}} \end{vmatrix} \cdot \begin{vmatrix} \cos\delta & -\sin\delta \\ \sin\delta & \cos\delta \end{vmatrix} \cdot \begin{vmatrix} \alpha \\ \beta \end{vmatrix} \end{aligned} \tag{4}$$

Then, the reflected beam is retransmitted through the birefringent layer, and reintroduced into the recording layer. The beam currently incident upon the recording layer is subjected to the optical rotatory power by the recording layer again, while the direction of polarization rotation is opposite as viewed from the substrate since the beam advances oppositely to the above. In other words, the current angle of polarization rotation is $-\delta$ as viewed from the substrate. Such an optical rotatory power of $-\delta$ is matrix-represented as follows:

$$R(-\delta) = \begin{vmatrix} \cos\delta & \sin\delta \\ -\sin\delta & \cos\delta \end{vmatrix} \tag{6}$$

Therefore, the polarized state of the reflected beam retransmitted through the recording layer can be expressed as follows:

$$E_3 = R(-\delta) \cdot P(\gamma) \cdot P(\gamma) \cdot P(\delta) \cdot E_0 \quad (7)$$

$$= \begin{vmatrix} \cos\delta & \sin\delta \\ -\sin\delta & \cos\delta \end{vmatrix} \cdot \begin{vmatrix} e^{i\frac{\gamma}{2}} & 0 \\ 0 & e^{-i\frac{\gamma}{2}} \end{vmatrix} \cdot \begin{vmatrix} e^{i\frac{\gamma}{2}} & 0 \\ 0 & e^{-i\frac{\gamma}{2}} \end{vmatrix} \cdot$$

$$\begin{vmatrix} \cos\delta & -\sin\delta \\ \sin\delta & \cos\delta \end{vmatrix} \cdot \begin{vmatrix} \alpha \\ \beta \end{vmatrix}$$

$$= D(\delta, \gamma) \cdot E_0$$

It is understood from expression (7) that the polarized state of the beam reflected by the recording medium can be changed from the state in incidence, in response to optical rotatory power of the recording layer and the retardation action of the birefringent layer.

When no optical rotatory power is caused in the recording layer, $\delta = 0$, and hence $\delta = 0$ is substituted in expression (7) as follows:

$$E_3 = \begin{vmatrix} 1 & 0 \\ 0 & 1 \end{vmatrix} \cdot \begin{vmatrix} e^{i\gamma} & 0 \\ 0 & e^{-i\gamma} \end{vmatrix} \cdot \begin{vmatrix} 1 & 0 \\ 0 & 1 \end{vmatrix} \cdot \begin{vmatrix} \alpha \\ \beta \end{vmatrix} \quad (8)$$

$$= \begin{vmatrix} e^{i\gamma} & 0 \\ 0 & e^{-i\gamma} \end{vmatrix} \cdot \begin{vmatrix} \alpha \\ \beta \end{vmatrix}$$

$$= D(\gamma) \cdot E_0$$

Thus, the beam is influenced only by the birefringent layer. Comparing the expression (7) with expression (8), $$D(\delta, \gamma) \neq D(\gamma)$$

Hence, the polarized state $E_3$ of the reflected beam is varied with presence/absence of optical rotatory power in the recording layer. Thus, it is possible to read information from the recording medium by detecting the difference in the polarized state of the reflected beam. Such difference of the polarized state can be detected, for example, by extracting the $E_3$ component of the reflected beam using a beam splitter and judging the value of this component.

When the recording medium is provided without a birefringent layer, as in the prior art, $\gamma = 0$. Hence when $\gamma = 0$ is substituted in expression (7), this equation becomes:

$$E_3 = \begin{vmatrix} \cos^2\delta + \sin^2\delta & 0 \\ 0 & \sin^2\delta + \cos^2\delta \end{vmatrix} \cdot \begin{vmatrix} \alpha \\ \beta \end{vmatrix}$$

$$= \begin{vmatrix} 1 & 0 \\ 0 & 1 \end{vmatrix} \cdot \begin{vmatrix} \alpha \\ \beta \end{vmatrix}$$

$$= \begin{vmatrix} \alpha \\ \beta \end{vmatrix}$$

Hence, $E_3 = E_0$ and no difference in the polarized state is caused between an incident beam and a reflected beam even though optical rotatory power is present in the recording layer. Thus, the information recorded in the recording layer cannot be reproduced.

Description is now made on such case that a linearly polarized light beam is applied to a recording medium so that its plane of polarization matches with the neutral axis (fast axis or slow axis) of a birefringent layer, the thickness of which is set so that the retardation is a constant $\pi/2$. Conditions in this case are expressed as follows:

$$E_0 = \begin{vmatrix} 1 \\ 0 \end{vmatrix} \quad (9)$$

$$\gamma = \frac{\pi}{2} \quad (10)$$

Expressions (9) and (10) are substituted in expression (7), to attain the following expression:

$$E_3 = i \cdot \begin{vmatrix} \cos2\delta & \sin2\delta \\ -\sin2\delta & \cos2\delta \end{vmatrix} \cdot \begin{vmatrix} 1 \\ 0 \end{vmatrix} \quad (11)$$

$$= i \cdot \begin{vmatrix} \cos2\delta & \sin2\delta \\ -\sin2\delta & \cos2\delta \end{vmatrix} \cdot E_0$$

Expression (11) indicates that the plane of polarization is rotated by $-2\delta$ as compared with the plane of polarization at incidence. Furthermore, if no optical rotatory power is caused in the recording layer, $\delta = 0$ and hence the polarized state of the reflected beam is expressed as follows:

$$E_3 = i \cdot \begin{vmatrix} 1 & 0 \\ 0 & 1 \end{vmatrix} \cdot E_0 \quad (12)$$

$$= i \cdot E_0$$

In the expression (12), i indicates that the overall phase of the beam is shifted by $\pi/2$, and hence the polarized state of $E_3$ is not substantially different from $E_0$, which is the polarized state of the beam at the time of incidence.

FIGS. 8A to 8F illustrate states of rotation of the azimuth angle of the polarization of a polarized light beam in an embodiment of the present invention. A recording medium according to this embodiment is separately provided with a recording layer and a birefringent layer.

Figure 8A:
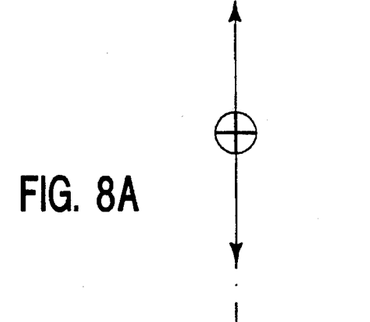
FIG. 8A shows the plane of polarization of the beam introduced into a recording layer.

FIG. 8A shows the plane of polarization of the beam that is incident upon the recording layer. Referring to FIGS. 8A to 8F, the dot-dashed lines denote the direction of the fast axis of the birefringent layer.

As shown in FIG. 8A, a linearly polarized light beam is introduced into the recording medium having its plane of polarization match the direction of the fast axis of the birefringent layer.

Figure 8B:
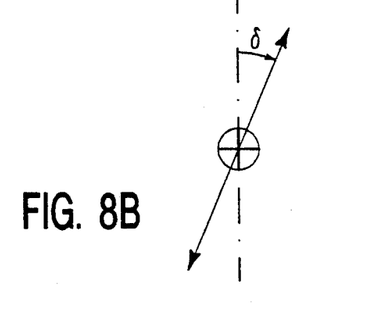
FIG. 8B shows the plane of polarization of the beam transmitted through the recording layer to be incident upon a birefringent layer.

FIG. 8B shows the plane of polarization of the polarized light beam transmitted through the recording layer to be incident upon the birefringent layer. As shown in FIG. 8B, the plane of polarization of the beam is rotated clockwise through an angle $\delta$ after transmission through the recording layer.

Figure 8C:
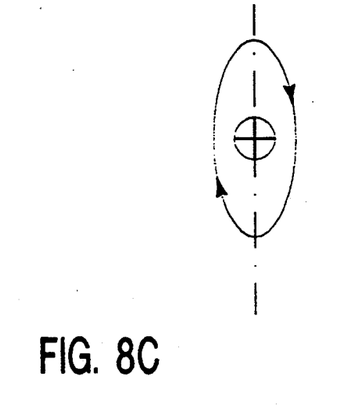
FIG. 8C shows the plane of polarization of the beam, transmitted through the birefringent layer, which is on the point of being reflected by a reflecting layer.

FIG. 8C shows the plane of polarization of the beam, transmitted through the birefringent layer, which is on the point of being reflected by the reflecting layer. When the beam is incident upon the birefringent layer, a constant retardation of $\pi/2$ takes place between $E_x$ and $E_y$ components of the beam, which in turn is changed to an elliptically polarized light beam as shown in FIG. 8C.

Figure 8D:
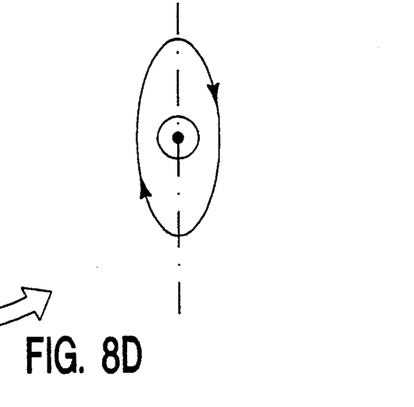
FIG. 8D shows the plane of polarization of the beam just reflected by the reflecting layer.

FIG. 8D shows the polarized light beam just reflected by the reflecting layer. The beam is reflected by the reflecting layer in the state of said elliptically polarized light beam.

Figure 8E:
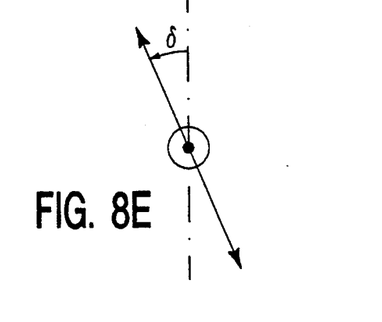
FIG. 8E shows the plane of polarization of the beam retransmitted through the birefringent layer to be reintroduced into the recording layer.

FIG. 8E shows the beam which is retransmitted through the birefringent layer to be reintroduced into the recording layer. As shown in FIG. 8E, a constant retardation of $\pi/2$ again takes place in the beam after retransmission through the birefringent layer, to cause a total retardation of $\pi$ in the beam. Consequently, the beam is converted to a linearly polarized light beam whose plane of polarization is rotated counterclockwise by $\delta$ with respect to the fast axis of the birefringent layer immediately before exiting from the birefringent layer, as shown in FIG. 8E.

Figure 8F:
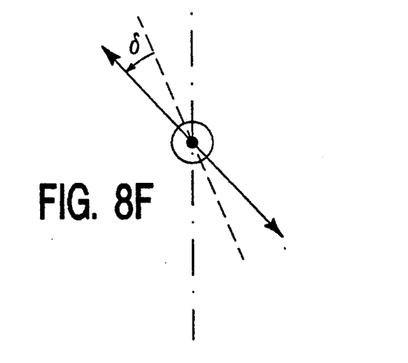
FIG. 8F shows the plane of polarization of the beam retransmitted through the recording layer.

FIG. 8F shows the plane of polarization of the beam retransmitted through the recording layer. When the beam is thus reintroduced into the recording layer, its plane of polarization is rotated counterclockwise by $\delta$ opposite to the direction of incidence, since the beam advances opposite to the direction of incidence. Consequently, the plane of polarization of the beam exiting from the recording medium is rotated counterclockwise by 2 $\delta$ as compared with that in incidence, as shown in FIG. 8F.

When the recording layer has no optical rotatory power, no rotation of the azimuth angle of the polarization as shown in FIG. 8B, takes place. Thus, the beam is so introduced that its plane of polarization matches with the neutral axis of the birefringent layer, and hence the birefringent layer causes no change in polarized state. Consequently, the beam is reflected from the recording medium in the same polarized state as that in incidence.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8A to 8F illustrate states of rotation of the azimuth angle of the polarization of a polarized light beam in the embodiment according to the present invention, in which:

FIGS. 11A to 11D illustrate states of rotation of the azimuth angle of the polarization of a beam in the conventional recording medium shown in FIG. 10, in which:

DESCRIPTION OF THE PREFERRED EMBODIMENTS

Figure 1:
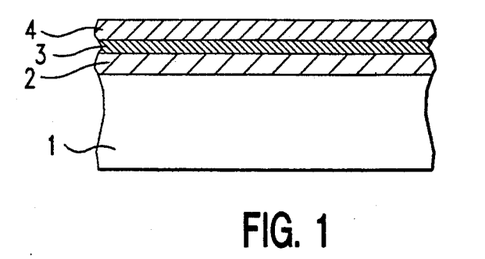
FIG. 1 is a sectional view showing an embodiment according to the present invention.

FIG. 1 is a sectional view showing a recording medium according to an embodiment of the present invention. Referring to FIG. 1, a recording layer 2 is formed on a substrate 1. A birefringent layer 3 is formed on the recording layer 2, and a reflecting layer 4 is formed on the birefringent layer 3. In this embodiment, the substrate 1 is made of quartz glass. A photochromic material is applied onto the substrate 1 by a spin coating method, to form the recording layer 2 in a thickness of 1 $\mu$m. A quarter-wave plate of artificial crystal is brought into close contact with the recording layer 2, to form the birefringent layer 3 having a constant birefringence. Further, aluminum is vacuum-deposited on the birefringent layer 3 to form the reflecting layer 4 having a thickness of 1000 Å.

Figure 2:
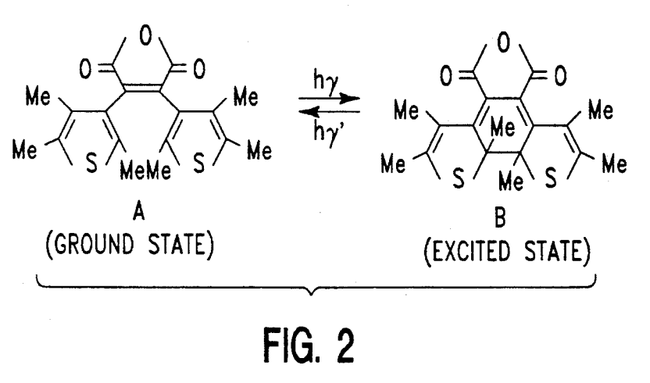
FIG. 2 illustrates chemical structures of an exemplary material which is useful as a recording layer in the present invention.

FIG. 2 shows the photochromic material for the recording layer 2. Referring to FIG. 2, the left part A shows a ground state and the right part B shows an excited state, while symbol Me represents methyl groups.

Figure 3:
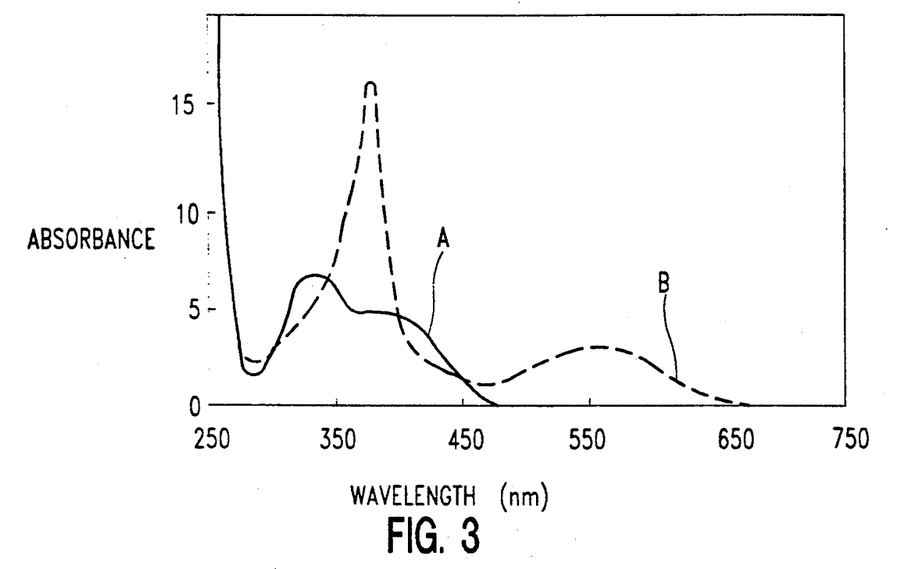
FIG. 3 illustrates absorptiveness of the exemplary material which is useful as the recording layer in the present invention.

FIG. 3 illustrates absorptiveness of the photochromic material shown in FIG. 2. When the material is in the ground state (A), i.e., a state wherein the material does not have optical rotatory power, its absorption peak appears at a wavelength around 400 nm or 325 nm as shown in FIG. 3. Thus, the molecular structure of the material is changed to an excited state, i.e., a state wherein the material has optical rotatory power, when the material is exposed to a beam whose wavelength is around 400 nm or 325 nm. When the material is in the excited state (B), on the other hand, its molecular structure is changed from the excited state to a ground state upon exposure to a beam whose wavelength is around 550 nm. In summary, this photochromic material exhibits no optical rotatory power when the material is in the ground state, while it exhibits optical rotatory power when the material is in the excited state.

Such a photochromic material was dissolved in methyl ethyl ketone (MEK), and polyvinyl butyral (PVB) was added thereto as a binder to obtain a solution, which was then applied onto a substrate.

A beam emitted from an incandescent lamp was filtered selectively apply only a beam whose wavelength was longer than 500 nm to the recording medium shown in FIG. 1, thereby bringing the overall molecules of the photochromic material, forming the recording layer 2, into a ground state. Then, this recording medium was exposed to a beam from a semiconductor laser having a wavelength of 780 nm, which is hardly absorbed by the photochromic material, and rotation of the azimuth angle of the polarization was measured in the beam reflected from the recording medium. The laser beam was applied to the recording medium with its plane of polarization matched with the fast axis or the slow axis of the birefringent layer 3. As such, the medium, while in the ground state, produces no rotation of the azimuth angle of the polarization. Consequently, no rotation of the azimuth angle of the polarization was detected.

Then, a beam of 325 nm in wavelength was applied to the same recording medium from an He-Cd laser, to bring the molecules in the recording layer 2 into an excited state. Thereafter, another laser beam was applied to the recording medium in a similar manner to that described above, and rotation of the azimuth angle of the polarization was measured. Consequently, rotation of the azimuth angle of the polarization was detected in the beam reflected from the recording medium.

For the purpose of comparison, a similar experiment was made on the conventional recording medium shown in FIG. 10, which was provided without a birefringent layer. This recording medium was similar in composition, size and forming method of each layer described in the above example. Consequently, rotation of the azimuth angle of the polarization was not detected even if optical rotatory power was produced in the recording layer.

From these test results, it has been confirmed that rotation of the azimuth angle of the polarization is produced in a reflected beam only when a birefringent layer is included in the recording medium and the recording layer has optical rotatory power. Without a birefringent layer as part of the recording medium, changes in the azimuth angle of the polarization caused by optical rotatory power of the recording layer are not detectable.

Figure 4:
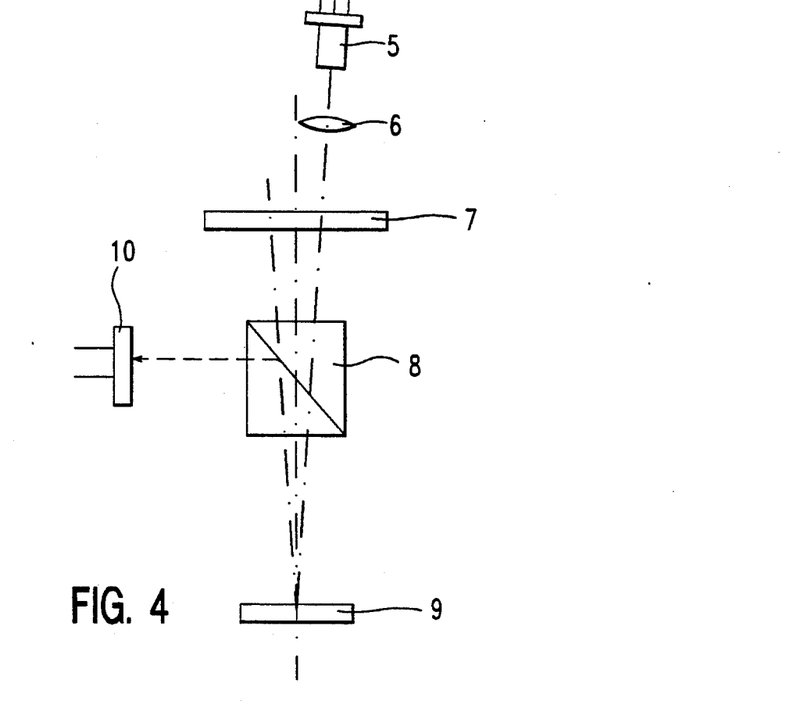
FIG. 4 schematically illustrates an exemplary optical system for reading information from a recording medium in the present invention.

FIG. 4 schematically shows an exemplary optical system for reading information from the recording medium according to the present invention. Referring to FIG. 4, a collimator lens 6 is provided in front of a semiconductor laser 5, which emits a beam of 780 nm in wavelength. A polarizer 7 is provided in front of the collimator lens 6, in order to remove random-polarized spontaneous emission components from the beam emitted from the semiconductor laser 5. A polarizing beamsplitter 8 is provided in front of the polarizer 7 so that its transmission of polarization matches with the plane of polarization of a linearly polarized light beam through the polarizer 7, in order to entirely transmit the beam. A recording medium 9 is provided in front of the polarizing beamsplitter 8. An optical sensor 10 is provided on the side of the polarizing beamsplitter 8.

When no rotation of the azimuth angle of the polarization is caused in a beam reflected from the recording medium 9, the reflected beam which is incident upon the polarizing beamsplitter 8 is entirely transmitted therethrough. Such transmission occurs because the plane of polarization of the reflected beam matches the transmission plane of polarization of the polarizing beamsplitter 8. Thus, the optical sensor 10 receives absolutely no energy from the beam, and produces no signal at its output. On the other hand, if the recording medium 9 causes rotation of the azimuth angle of the polarization in the reflected beam, the plane of polarization of this reflected beam is inclined with respect to the transmission plane of polarization of the polarizing beamsplitter 8. The polarizing beamsplitter, in turn, transversely reflects a beam corresponding to the value of a rectangular component of the beam with respect to the transmission plane of polarization. Thus, the optical sensor 10 produces a signal at its output whose level represents the intensity of the laterally reflected beam.

In this case, it is preferable to set the semiconductor laser 5 and the recording medium 9 and arrangement of other optical elements in response thereto so that the plane of polarization of the beam from the semiconductor laser 5 matches with the fast axis or the slow axis of the birefringent layer 3, as hereinabove described. Thus, the plane of polarization of the beam incident upon the birefringent layer 3 is inclined with respect to the fast axis or the slow axis thereof only when optical rotatory power is present in the recording layer 2. In other words, the aforementioned change of the polarized state is caused by the birefringent layer 3 only when the recording layer 2 has optical rotatory power.

In this optical system, the semiconductor laser 5 is so arranged that the beam produced by the laser is incident upon the recording medium 9 in a slightly inclined manner, in order to expel backward light to the semiconductor laser 5. However, it is not necessary to incline the axis of said beam when the beam is produced by a multimode laser, which is resistant to noise of backward light.

Figure 5:
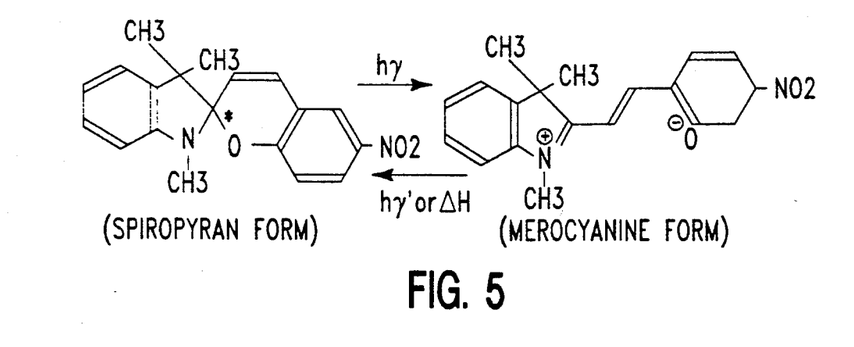
FIG. 5 illustrates chemical structures of another exemplary material which is useful as a recording layer in the present invention.

Spiropyran-derivative 1',3',3'-trimethyl-6-nitrospiro [2H-1-benzopyran-2,2'-indolin] (NBPS), a typical photochromic material, was employed as a material for a recording layer, which was subjected to an experiment similar to that described above. FIG. 5 shows the chemical structures of this material. The structure of this photochromic material is changed from a spiropyran form having optical rotatory power to a merocyanine form having no optical rotatory power by exposure to ultraviolet light, while the material is oppositely changed from the merocyanine form to the spiropyran form by exposure to visible light.

This photochromic material was employed as a material for recording layers, to form the recording media shown in FIGS. 1 and 10. As the result, no polarization rotation of a reflected beam was confirmed in the structure of the conventional recording medium shown in FIG. 10. On the other hand, in the inventive recording medium shown in FIG. 1, change in polarized state of a reflected beam was confirmed when the structure of the recording layer was brought into a spiropyran form having optical rotatory power.

Figure 6:
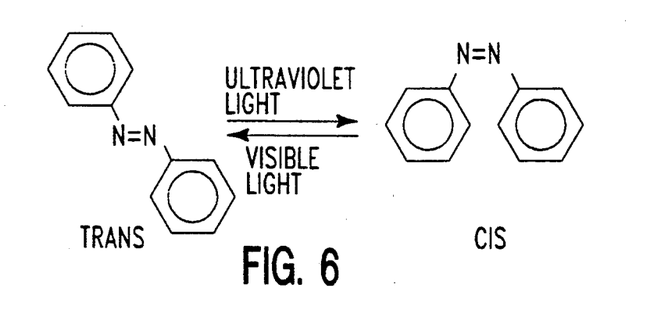
FIG. 6 illustrates chemical structures of still another examplary material which is useful as a recording layer in the present invention.

Furthermore, a compound of azobenzenecarboxylic acid cholesterol ester, another typical photochromic material, was employed for a recording layer, which was subjected to an experiment similar to that described above. In this photochromic material, an azobenzene group is changed from a trans form to a cis form by exposure to ultraviolet light (350 nm$<\lambda<$400 nm), while the material is oppositely changed from the cis form to the trans form by exposure to visible light ($\lambda>$450 nm). This transformation is depicted in FIG. 6. The material has large optical rotatory power when it is in the cis form, while it exhibits no optical rotatory power when the material is in the trans form.

10 mg of this photochromic material, 100 mg of n-nonanoic acid cholesterol ester and 22 mg of cholesteryl chloride were dissolved in 0.2 ml of chloroform, and this solution was applied onto a substrate by a spin coating method. Then, the chloroform was evaporated to form a recording layer.

The recording layer was formed in the aforementioned manner to prepare a recording medium having the structure shown in FIG. 1. Ultraviolet light was applied to this recording medium to change the recording layer into a cis form. When a linearly polarized light beam was applied to the recording medium which was changed into the state of the cis form, rotation of the azimuth angle of the polarization of a reflected beam was detected from the recording beam. No such rotation of the azimuth angle of the polarization was recognized when the recording layer was in a trans form.

In a recording layer of a photochromic material whose optical rotatory power is changed by exposure to light, the overall recording layer may not exhibit optical rotatory power even if its molecules are brought into a state having no optical rotatory power at the beginning and then exposed to random-polarized light to be brought into a state having optical rotatory power. This is because the recording layer is provided therein with the same amounts of molecules having rightward optical rotatory power to rightwardly rotate the plane of linear polarization of a reproducing beam and those having leftward optical rotatory power to leftwardly rotate the beam. In this case, ultraviolet light of 325 nm in wavelength may be applied to the material shown in FIG. 2, for example, to bring its molecules into the state B, and thereafter two types of molecules which are opposite in optical rotatory power to each other may be separated by an optical isomer separation column or the like, to form a recording layer through either type of the separated molecules. At this time, the recording layer is changed from a state having optical rotatory power to a state having no such power by exposure to light having a wavelength of about 550 nm. Consequently, it is possible to detect a change in optical rotatory power of the inventive recording medium using reflected light therefrom.

While various examples of the present invention have been described, the present invention is not restricted to such examples.

Although the birefringent layer used in the aforementioned embodiment is prepared from a quarter-wave plate of artificial crystal having a constant birefringence, the quarter-wave plate can alternatively be prepared from a material such as TiO$_2$, CaCO$_3$, NaNO$_3$ or the like. When TiO$_2$ is employed for forming a quarter-wave plate, its thickness can be reduced to 0.7 $\mu$m, which is about 1/30 the thickness of the artificial crystal used above.

In the aforementioned embodiment, the birefringent layer is formed by a quarter-wave plate. This means that the birefringent layer is set in such a thickness that its retardation is a constant $\pi/2$ with respect to the waveband of the semiconductor laser beam. However, it is also possible to detect rotation of the azimuth angle of the polarization without setting the birefringent layer to such a thickness.

Additionally, in the foregoing embodiment, the semiconductor laser is arranged such that the plane of polarization of the beam emitted from the semiconductor laser matches the fast axis or the slow axis of the birefringent layer. However, it is possible to detect rotation of the azimuth angle of the polarization without arranging the semiconductor laser in such a manner.

Figure 7A:
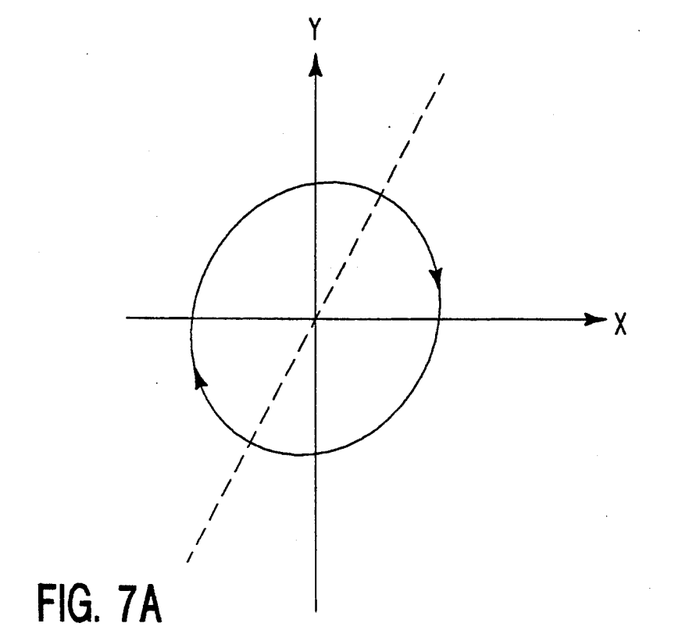
FIG. 7A illustrates a polarized state of a reflected light beam obtained when an elliptically polarized light beam is applied to a recording medium which is provided with a recording layer having no optical rotatory power.
Figure 7B:
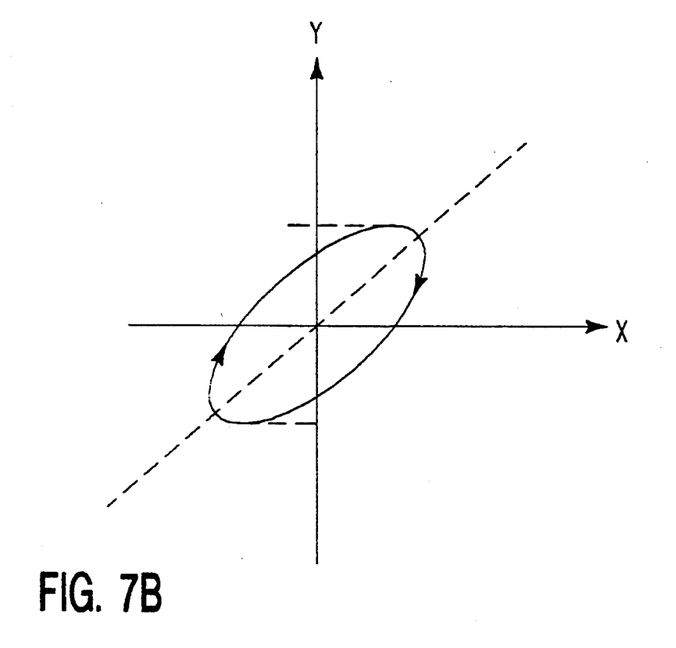
FIG. 7B illustrates a polarized state of a reflected beam obtained when a circularly polarized light beam is applied to a recording medium which is provided with a recording layer having optical rotatory power.

The aforementioned embodiment has shown a specific example which can most easily detect rotation of the azimuth angle of the polarization of a light beam reflected from the inventive recording medium. However, it is also possible to detect rotation of the azimuth angle of the polarization by another method, which, as yet, is a complicated method. For example, it is possible to measure rotation of the azimuth angle of the polarization without setting the thickness of the birefringent layer of the recording medium to have the same action as a quarter-wave plate and/or without making the plane of polarization of the semiconductor laser beam match the fast axis of the birefringent layer. For example, as to a beam reflected from a recording medium, the polarized state of an elliptically polarized light depends on whether or not the recording layer has optical rotatory power. FIG. 7A shows a state in relation to a recording layer having no optical rotatory power, and FIG. 7B shows a polarized state in relation to a recording layer having optical rotatory power. Since the polarized state of an elliptically polarized light is thus varied, it is possible to detect the state of a recording layer by forming an optical system which can detect intensity of the polarized component along the Y-axis shown, for example, in FIG. 7A, or 7B.

Although the birefringent layer is provided between the recording layer and the reflecting layer in the embodiment described above, the recording layer may be provided with not only the optical rotatory power but with the constant birefringent action, to serve as a recording/birefringent layer. According to such an embodiment, the structure of the recording medium can be further simplified since it is not necessary to separately provide the birefringent layer.

Such a recording/birefringent layer can be obtained, for example, by stretching a material having optical rotatory power. It is known that a birefringent action is generally produced in a unidirectionally stretched material so that its fast axis or slow axis is parallel to the direction of stretching. Therefore, it is possible to produce a material having both the optical rotatory power and the constant birefringent action. Such a material is formed by providing a thin film having optical rotatory power and then unidirectionally stretching the thin film.

In accordance with this embodiment, a recording medium having a recording/birefringent layer was prepared. The photochromic material shown in FIG. 5 was dissolved in a trichlorophenol solution to which polyethylene terephthalate (PET) was added, and this mixture was applied onto a glass substrate by a spin coating method to form a thickness of 5 to 10 $\mu$m, thereby forming a recording film. Then, this recording film was separated from the glass substrate, and unidirectionally stretched to induce birefringence. This recording film was struck onto a quartz substrate, to define a recording/birefringent layer having a constant birefringence.

Figure 9:
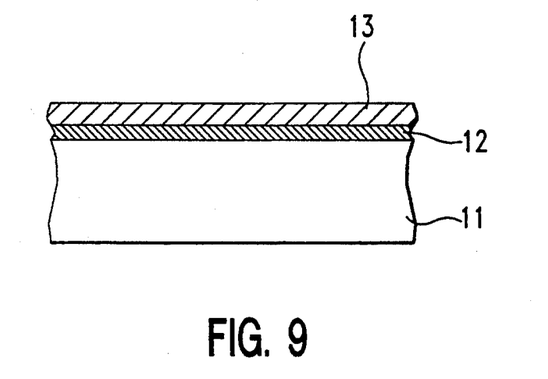
FIG. 9 is a sectional view showing another embodiment according to the present invention.

An aluminum reflecting layer of 1000 Å in thickness was formed on the recording/birefringent layer by vacuum deposition. FIG. 9 is a sectional view showing the as-formed recording medium according to the second embodiment of the present invention. Referring to FIG. 9, a recording/birefringent layer 12 is formed on a substrate 11, and reflecting layer 13 is formed on the recording/birefringent layer 12.

The recording medium obtained in the aforementioned manner was employed for experimentally recording/reproducing information in the system shown in FIG. 4.

First, a beam having a the wavelength of longer than 500 nm was applied to the recording medium to change the overall photochromic material contained in the recording/birefringent layer to a spiropyran form. A beam emitted from an incandescent lamp was filtered to extract the beam to be applied to the recording medium. The system shown in FIG. 4 was employed for applying the beam to the recording medium, while the output of the sensor 10 was measured.

Then, an ultraviolet laser beam was emitted to the recording medium from an He-Cd laser, to change the overall photochromic material contained in the recording/birefringent layer to a merocyanine form. The output signal of the sensor 10 was measured through the system shown in FIG. 4. In this measurement, the direction of a neutral axis of the recording/birefringent layer, i.e., the direction of stretching of the recording medium, was made to match with that in the preceding measurement.

In this experiment, a difference occurred in the level of the output from the sensor. Thus, this experiment confirmed that change of optical rotatory power can be detected by a beam reflected by the recording medium through the recording/birefringent layer having both the optical rotatory power and the birefringent action.

Although the present invention has been described and illustrated in detail, it is clearly understood that the same is by way of illustration and example only and is not to be taken by way of limitation, the spirit and scope o the present invention being limited only by the terms of the appended claims.

What is claimed:

1. An optical recording medium consisting only of:
    a recording layer having a material with optical rotatory power which changes in response to information recorded in said recording layer;
    a reflecting layer situated above the recording layer for reflecting a polarized light beam transmitted through both the recording layer and a birefringent layer so as to produce a reflected beam and to reintroduce the reflected beam into said birefringent layer and the recording layer; and
    the birefringent layer situated between said recording layer and the reflecting layer for changing a state of the polarized light beam, said birefringent layer possessing a constant birefringence regardless of the information recorded in the recording layer.

2. A recording medium in accordance with claim 1, wherein said birefringent layer is formed by bringing a plate having a birefringent action into close contact with said recording layer.

3. A recording medium in accordance with claim 1, wherein said birefringent layer has a columnar structure obliquely grown with respect to a substrate.

4. A recording medium in accordance with claim 1, wherein said recording layer comprises a material wherein the optical rotatory power is changed by application of light.

5. A recording medium in accordance with claim 1, wherein said recording layer comprises a material wherein the optical rotatory power is changed by heat.

6. An optical recording medium comprising:
    a recording/birefringent layer having a material with optical rotatory power and a birefringence, wherein the optical rotatory power changes in response to information recorded in said layer and said birefringence is constant regardless of the information recorded in said layer; and
    a reflecting layer situated above said recording/birefringent layer for reflecting said beam transmitted through said recording/birefringent layer so as to produce a reflected beam and to reintroduce the reflected beam into the recording/birefringent layer.

7. A recording medium in accordance with claim 6, wherein said recording/birefringent layer is formed by unidirectionally stretching a thin film comprising a material having optical rotatory power.

8. A recording medium in accordance with claim 7, wherein said recording/birefringent layer further comprises a polymer material.

9. A recording medium in accordance with claim 6, wherein said recording/birefringent layer comprises a material wherein the optical rotatory power is changed by application of light.

10. A recording medium in accordance with claim 6, wherein said recording/birefringent layer comprises a material wherein the optical rotatory power is changed by heat.

* * * * *